(12) United States Patent
Waldmiller

(10) Patent No.: US 7,334,527 B2
(45) Date of Patent: Feb. 26, 2008

(54) TROLLEY ATTACHMENT

(75) Inventor: Lee R Waldmiller, Grand Rapids, MI (US)

(73) Assignee: Frost, Inc., Grand Rapids, MI (US)

( * ) Notice: Subject to any disclaimer, the term of this patent is extended or adjusted under 35 U.S.C. 154(b) by 355 days.

(21) Appl. No.: 11/088,698

(22) Filed: Mar. 24, 2005

(65) Prior Publication Data
US 2005/0217531 A1 Oct. 6, 2005

Related U.S. Application Data

(60) Provisional application No. 60/521,345, filed on Apr. 6, 2004.

(51) Int. Cl.
B61B 3/00 (2006.01)
(52) U.S. Cl. ............ 105/148; 105/150; 104/89
(58) Field of Classification Search ............ 104/89, 104/93, 94, 95, 172.3, 172.4; 105/148, 150, 105/154, 155; 198/678.1, 680, 686, 687, 198/681, 685, 687.1, 682; 403/79, 157
See application file for complete search history.

(56) References Cited

U.S. PATENT DOCUMENTS 3,587,473 A * 6/1971 Weiss ............ 104/93
4,993,328 A 2/1991 Wendt et al.
5,156,533 A 10/1992 Hoffman et al.
5,398,618 A 3/1995 McMullen
6,241,082 B1 6/2001 Vanmenen et al.
6,880,469 B2 4/2005 Frost

* cited by examiner

Primary Examiner—Mark T. Le
(74) Attorney, Agent, or Firm—Vandyke, Gardner, Linn & Burkhart LLP

(57) ABSTRACT

A trolley for a conveying system includes a first trolley arm with a trolley wheel rotatably mounted thereon, a second trolley arm with a trolley wheel rotatably mounted thereon, and a load bar. The trolley wheels roll along a track of the conveying system to move the trolleys along the conveyor track. The first trolley arm connects to a first attachment element, which includes a base portion and an attaching member that are integrally formed together. The load bar connects to the second trolley arm and to the attaching member of the first attachment element. The load bar has a slot proximate to one or both ends for receiving the attaching member. The attaching member is retainable in the slot, such as via a retaining pin. The first and second trolley arms are connected together via the load bar.

18 Claims, 5 Drawing Sheets

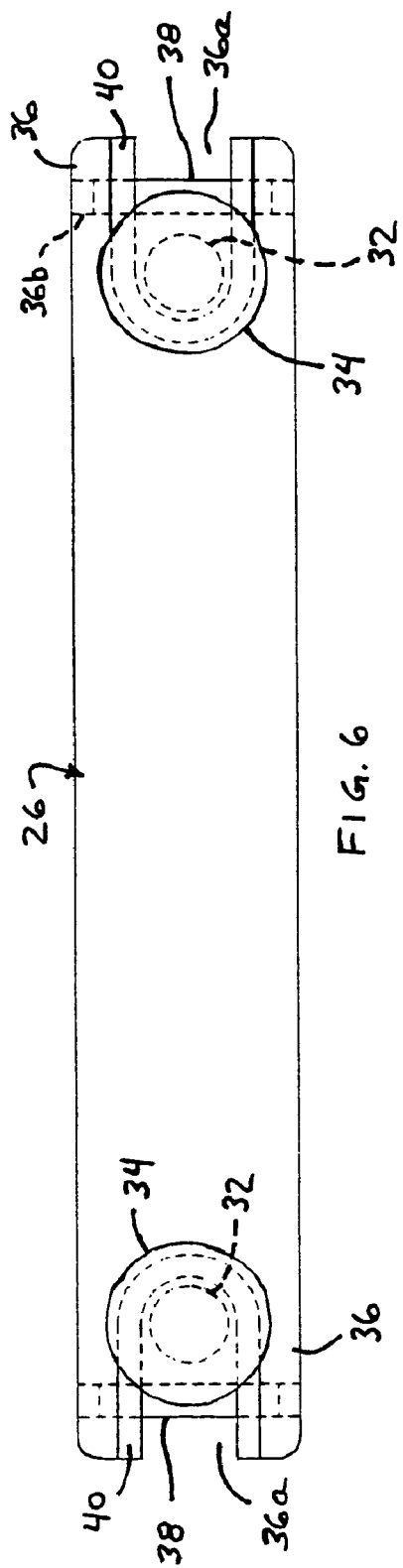
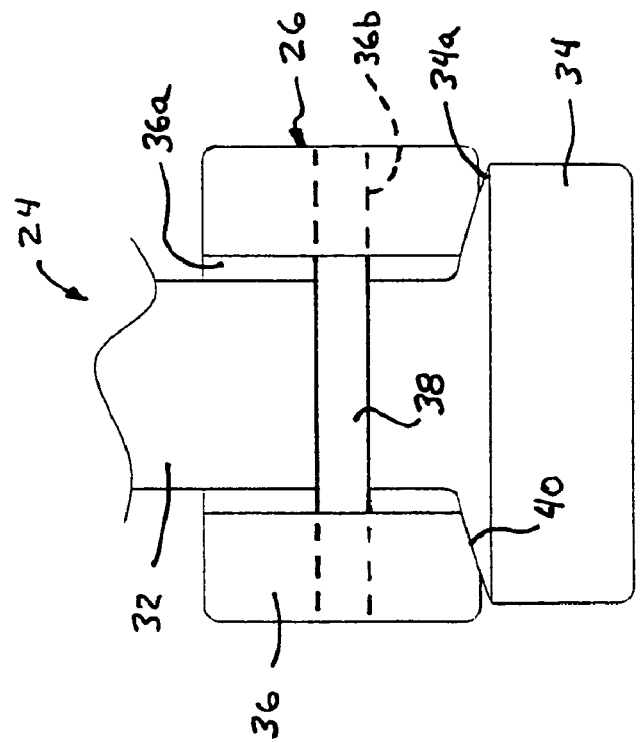

TROLLEY ATTACHMENT

CROSS REFERENCE TO RELATED APPLICATION

The present application claims benefit of U.S. provisional application Ser. No. 60/521,345, filed Apr. 6, 2004, which is hereby incorporated herein by reference in its entirety.

FIELD OF THE INVENTION

The present invention relates generally to trolleys and, more particularly, to trolleys for material handling and conveying systems.

BACKGROUND OF THE INVENTION

It is known to provide a trolley which is movable along a conveyor track, such as an I-beam track or a pair of oppositely facing C-channel tracks. The trolley typically includes a pair of opposite arm portions which include a corresponding trolley wheel for engaging a respective one of the channels or tracks. The trolley arms are secured together about a spacer or attachment, which fits between the lower portions of the trolley arms to facilitate attachment of the trolley arms to the chain which drives the trolley along the track. As shown in FIG. 1, a typical spacer 2 may have a threaded stud 3 attached thereto and extending downward therefrom for connecting to a load bar 4. The stud 3 may insert through a bushing 5 and/or washer 6 of the load bar, and the load bar may be secured to the stud via a nut 7.

In order to attach the load bar to the trolley or trolleys, an operator must thread and tighten the nut onto the stud, which may be labor intensive. Also, when the material handling system and trolleys are implemented in caustic environments, concerns exist with the durability of the threaded stud and nut. For example, chemicals and/or the like that may be encountered in such caustic environments may lead to corrosion of the threaded stud, whereby the nut may eventually slide off or detach from the stud. This may cause the load bar to detach from the trolley and fall to the ground, which is a safety concern and may also be damaging to the trolley and the material conveyed by the trolley and to the facility. Although some applications may include a cotter pin or the like through the nut to retain the nut to the stud, the cotter pins are often not robust enough and may shear under the loads applied by the load bar.

Therefore, there is a need in the art for a trolley and material handling system which overcomes the shortcomings of the prior art.

SUMMARY OF THE INVENTION

The present invention provides a trolley which includes a load bar attachment or attaching member that is integrally formed with the body portion or spacer portion or element of the trolley. The load bar attaching member includes an enlarged end for limiting downward movement of a load bar or member when a portion of the load bar attaching member is received within a slot or channel at a respective end of the load bar or member.

According to an aspect of the present invention, a trolley for a conveying system includes a first trolley arm with a trolley wheel rotatably mounted thereon, a second trolley arm with a trolley wheel rotatably mounted thereon, and a load bar. The first trolley arm connects to a first spacer or attachment element, which includes a base portion and an attaching member. The base portion and the attaching member are integrally formed together. The load bar connects to the second trolley arm and to the attaching member of the first attachment element. The load bar has a slot or channel or receiving portion at at least one end for receiving a shaft portion of the attaching member. The shaft portion of the attaching member is received in the slot and is retained or secured in the slot, such as via a retaining pin or the like (which may limit longitudinal movement of the attaching member in the slot to retain the load bar at the attaching member and, thus, at the spacer or attachment element and the trolley arm). The attaching member includes an end portion or head portion integrally formed at a lower end of the shaft portion (with the head portion having a greater diameter or dimension than the shaft portion) to limit downward movement of the load bar when the shaft portion is received in the slot of the load bar. The first and second trolley arms are connected together via the load bar and move together along the conveyor track as the trolley wheels generally align with and roll along the conveying track.

The conveying track may comprise a C-channel conveying track or an I-beam conveying track or other type of conveying track. Each of the trolley wheels may be rotatably movable along a respective one of the channels or tracks. The attaching member includes the shaft portion, which is configured to be received in the slot, and the end or head portion, which has a larger diameter than the shaft portion. The end or head portion is configured to limit downward movement of the end of the load bar when the load bar is attached to the attaching member. The first attachment element may comprise a unitarily forged attachment element.

Optionally, the second trolley arm may connect to a second spacer or attachment element, which may include a base portion and an attaching member. The base portion and the attaching member may be integrally formed together, and the attaching member of the second attachment element may be received within a slot or channel or receiving portion at the other end of the load bar.

Therefore, the present invention provides a load bar attachment for a trolley which includes a load bar and an attachment element for securing the load bar to the trolley. The attachment element may comprise a unitary component and may be received within a slot or channel or receiving portion of the load bar and retained therein, such as via a pin or the like.

The attachment element of the load bar to the trolley thus does not require any threaded fasteners and, thus, substantially obviates the corrosion concerns of the prior art. Also, the attaching member may be readily attached to the load bar without having to tighten any threaded fasteners to a desired torque to retain the load bar thereon. The shaft portion of the attaching member may limit longitudinal and lateral movement of the load bar relative to the attaching portion, while the end or head portion limits downward movement of the load bar relative to the attaching member. The attachment or spacer element comprises a unitarily or integrally formed element, with the end portion, the shaft portion and the base portion being unitarily formed. The present invention thus provides a robust attachment assembly or system that also may be readily assembled by an operator at the conveying system.

These and other objects, advantages, purposes and features of the present invention will become apparent upon review of the following specification in conjunction with the drawings.

BRIEF DESCRIPTION OF THE DRAWINGS

FIG. 5 is an end elevation of the load bar and attachment member of the present invention; and FIG. 6 is a plan view of the load bar and attachment member of the present invention.

DESCRIPTION OF THE PREFERRED EMBODIMENTS

Figure 1:
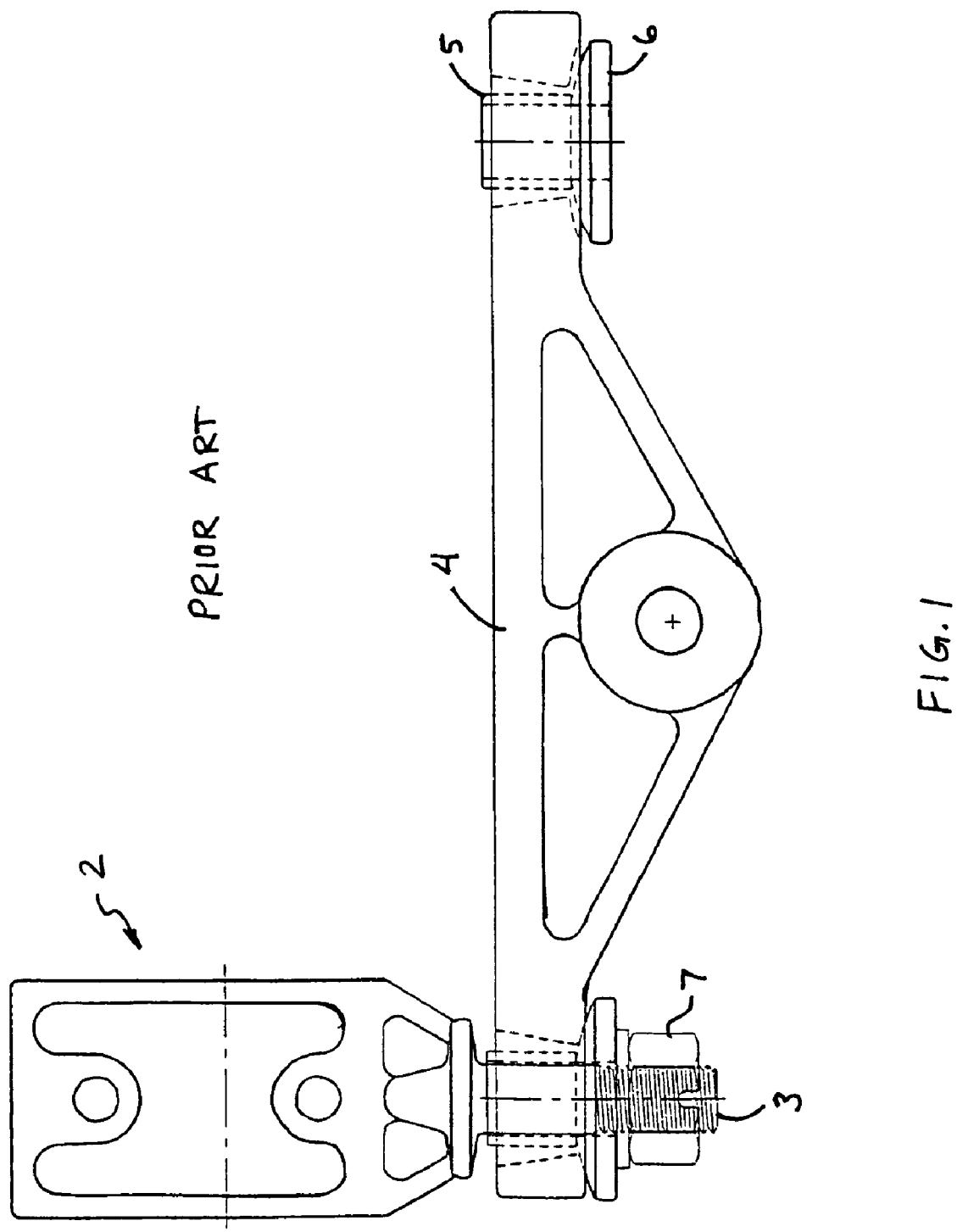
FIG. 1 is a side elevation of a known trolley and load bar connection.
Figure 2:
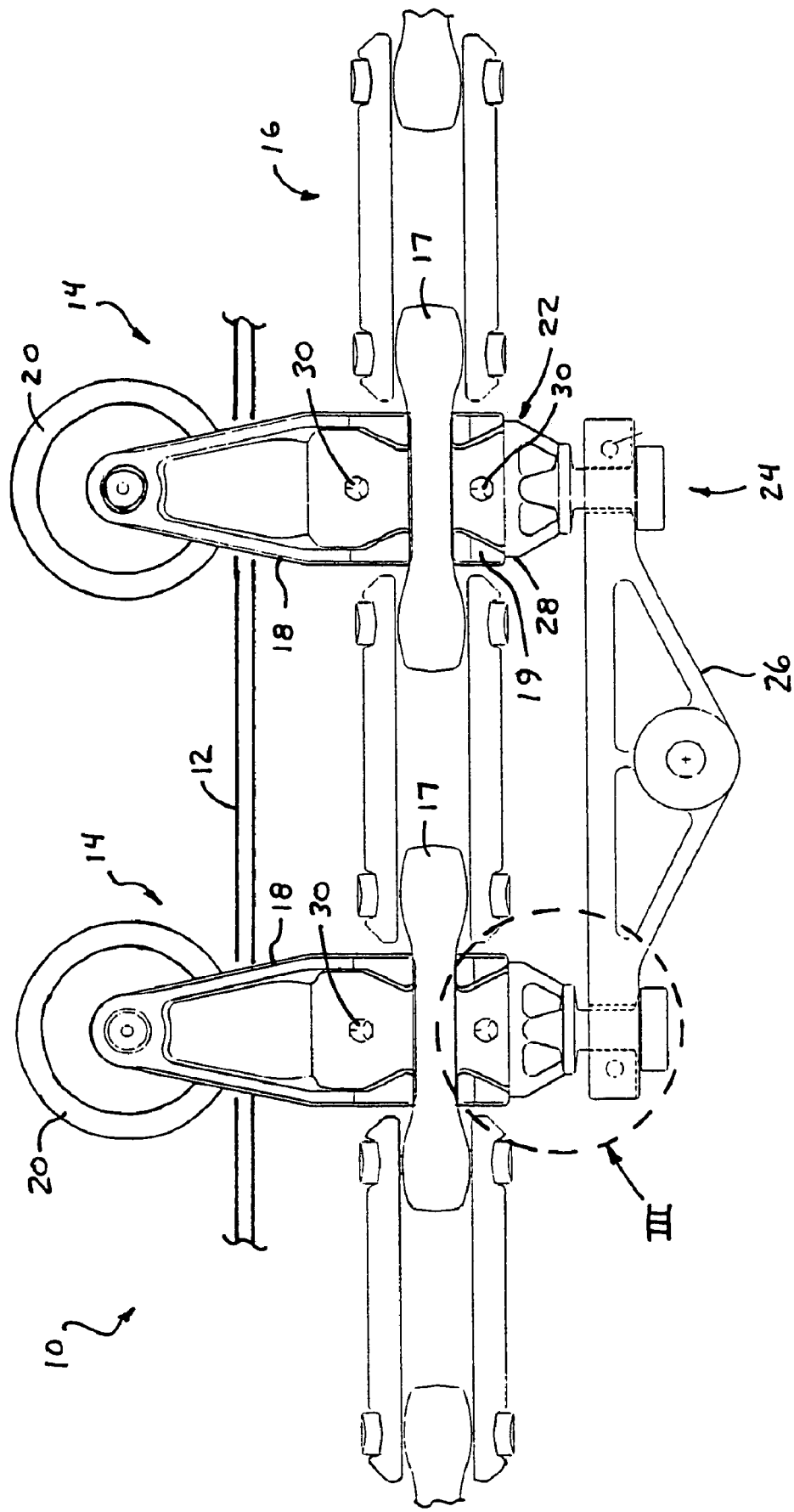
FIG. 2 is a side elevation of a trolley with a spacer and load bar in accordance with the present invention.
Figure 4:
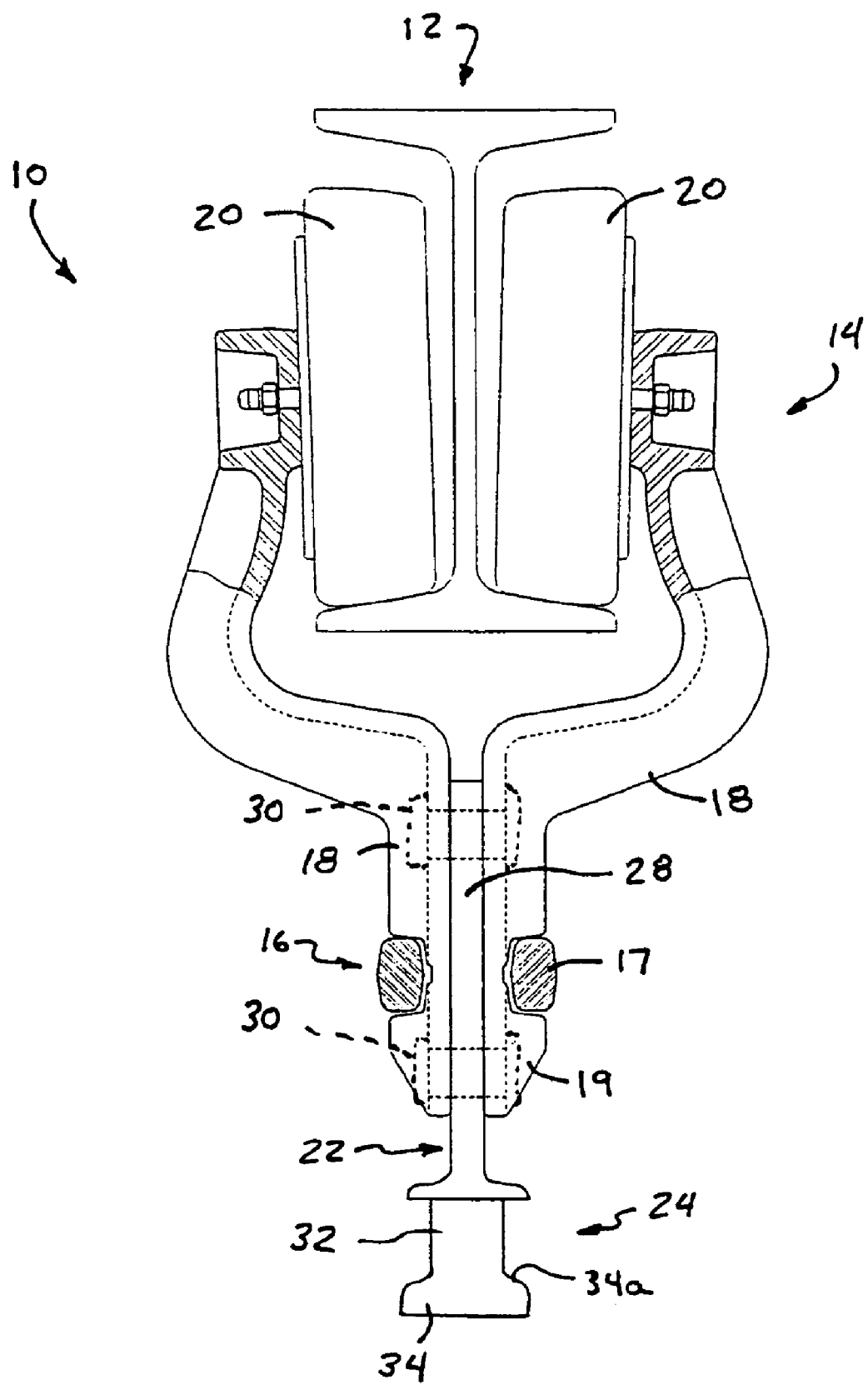
FIG. 4 is a sectional view of the center link and an end elevation of the trolley spacer of the present invention.

Referring now to the drawings and the illustrative embodiments depicted therein, a conveying system or trolley system 10 includes a conveying track 12 and a plurality of trolleys 14 which are movable along conveying track 12 via a chain 16 (FIG. 2). Each trolley 14 includes at least one trolley arm 18 (and may include a pair of trolley arms as shown in FIG. 4), each of which includes a trolley wheel 20 at an upper end thereof for rolling along conveying track 12, as discussed below. Trolley arms 18 extend downward from wheels 20 and are secured together at a lower portion thereof about a spacer or attachment element 22. Spacer or attachment element 22 includes a load bar attaching member 24 extending downwardly therefrom for attaching the trolley to a load bar 26, as discussed below. Trolley arms 18 may connect to one or more chain links 17 of chain 16, such that movement of chain 16 drives or moves trolley 14 along the conveying track 12. Conveying track 12 may include opposite facing, generally C-shaped channels (such as along spaced apart track portions or at opposite sides of an I-beam track or the like), each of which may rotatably receive a respective trolley wheel 20, which rolls along the respective C-shaped channel to move trolley 14 along the conveying track 12.

Figure 3:
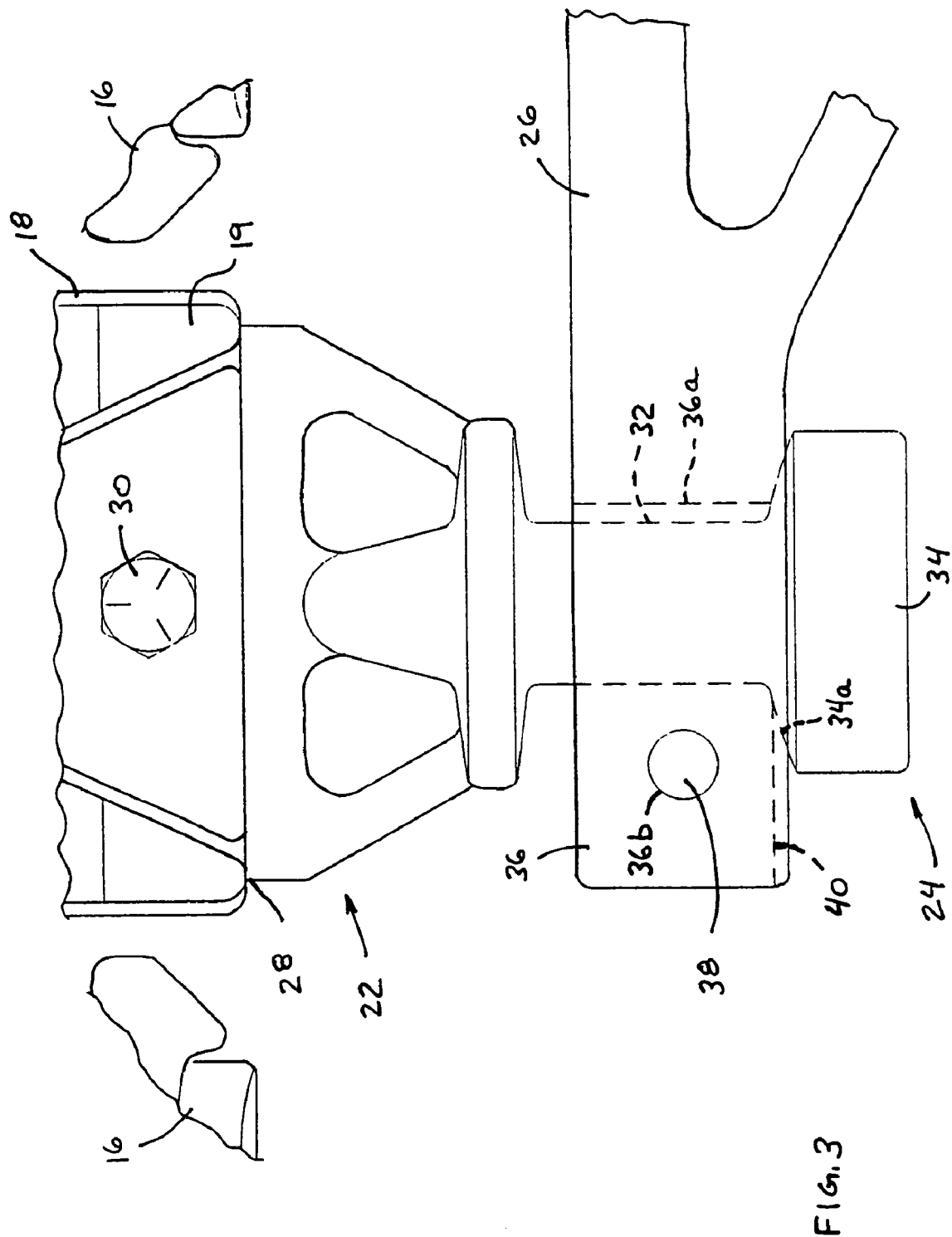
FIG. 3 is an enlarged view of the area III in FIG. 2.

Attachment or spacer element 22 is positioned generally between the lower portions 19 of trolley arms 18 and includes a body portion or spacer portion 28, which provides a spacing function to properly space the lower portions of the trolley arms after the lower portions 19 are attached to chain link 17, such as is known in the art with known spacing blocks. More particularly, as can be seen with reference to FIG. 4, the spacer element 22 may be removed to allow the lower portions 19 of trolley arms 18 to move or collapse together or toward one another to provide clearance for the lower portions 19 to be inserted into an opening (not shown) in center chain link 17 (such as a central opening between the opposite side portions 17a of the center link, which may comprise a generally oval or ring-shaped center link such as is known in the conveyor chain art). The spacer or attachment element 22 may be inserted between the trolley arms 18, and may be secured between the lower portions of trolley arms 18 via one or more fasteners 30, which extend through apertures or openings in spacer element 22 and apertures or openings in arms 18. The spacer thus may space the arms apart a desired amount after lower portions 19 are received through chain link 17, in order to maintain the lower portions 19 of arms 18 in engagement with chain link 17. As shown in FIGS. 2 and 3, the lower portions 19 of arms 18 may include lateral projections or tabs 19a for engaging the upper and/or lower portions of the chain link 17 to retain the arms relative to chain link 17 when the spacer or attachment element 22 is positioned and secured between arms 18.

Spacer or attachment element 22 includes body portion 28 and load bar attaching member 24, which extends downward from the body portion 28. Load bar attaching member 24 may extend downwardly to connect to the load bar 26, such as for connecting two or more trolleys together. Spacer or attachment element 22 may comprise a unitary formed or molded or forged component, such that load bar attaching member 24 may be integrally formed with body portion 28. In the illustrated embodiment, spacer element 22 comprises a unitary forged component, but may be formed via other forming or molding means, without affecting the scope of the present invention.

As best shown in FIGS. 3 and 4, attaching member 24 includes a shaft portion 32 and an end portion or head portion 34 formed at the lower end of shaft portion 32. Shaft portion 32 may comprise a generally cylindrical shaft portion integrally formed with and extending downward from body portion 28. End portion 34 may provide an enlarged end of the shaft portion and thus has a larger diameter or lateral/longitudinal dimension or effective diameter than the diameter or dimension of shaft portion 32.

Although shown and described as having a generally cylindrical shaft portion and a generally circular end portion or head portion, the attaching member may have an otherwise shaped shaft portion and end portion, without affecting the scope of the present invention. The shaft portion desirably has a rounded or substantially circular cross section to facilitate rotation or pivotal movement of the shaft portion in the slot as the load bar turns as the trolleys and chain and load bars negotiate the conveying path. The end or head portion may comprise any shape, and has a larger width dimension (the dimension of the head portion in the direction generally across or transverse to the slot in the load bar) than the width of the slot so that the head portion limits downward movement of the load bar relative to the attaching member when the shaft portion is received in the slot.

As best shown in FIGS. 2, 3, 5 and 6, load bar 26 includes slotted or forked ends 36, which may receive shaft portion 32 of attaching member 24 therein. Slotted ends 36 define a respective slot 36a, which receives the respective shaft portion 32, which may be moved longitudinally along the slot to an appropriate location within the slot. As can be seen in FIGS. 5 and 6, slotted end 36 may have a tapered or angled surface 40 along slot 36a, while end portion 34 of attaching member 24 may have a correspondingly tapered or angled upper surface 34a. Upper surface 34a thus substantially engages with tapered surface 40 and may rest within the recess and against the sloped or angled surface formed by the tapered surface 40.

A retaining pin 38 may be inserted through an opening 36b in the forked or slotted end 36 and outside of the shaft portion 32, in order to retain shaft portion 32 within the slot 36a. The retaining pin 38 may be retained in the openings in the forked end 36 to limit or substantially preclude dislodgement of the pin from the end of the load bar. For example, the retaining pin 38 may be retained at the end of the load bar via one or more cotter pins or the like, or via threaded engagement of the pin with the load bar, or via other fastening or securing means, without affecting the scope of the present invention. Although shown and described as a generally cylindrical retaining pin, other retaining means (such as, for example, other types of pins or clamps or elements that may at least partially span the open end of the slot to limit movement of the shaft portion out of the slot)

may be implemented to substantially retain the shaft portion in the slot of the load bar, without affecting the scope of the present invention.

Although shown with the slotted portions being open at the opposite longitudinal ends of the load bar such that the retaining pin may limit or substantially preclude longitudinal movement of the attaching member along the load bar and toward the open end, the slotted portion may be open at one of the sides of the load bar, whereby the retaining pin may limit or substantially preclude lateral movement of the attaching member across the load bar and toward the open side, without affecting the scope of the present invention. Because the retaining pin functions to limit or substantially preclude longitudinal movement of the attaching member toward and out from the end of the load bar, the retaining pin does not have to withstand the substantially greater downward forces exerted by the load bar against the end or head portion 34 of attaching member 24.

The load bar thus may be attached to the trolley or trolleys via insertion of the shaft portion of the attaching member into the slot or channel at the end of the load bar and then insertion of the retaining pin through the slotted end. The large or oversized end portion of the attaching member thus substantially retains the load bar on the attaching member and on the trolley and, because the end portion is unitarily formed with the shaft portion and body portion of the attaching member, will not dislodge from the end of the shaft portion regardless of what type of caustic environment the trolley may encounter. The present invention thus provides a means for attaching a load bar to a trolley that does not require a threaded nut on a stud and, thus, provides an enhanced assembly process and an enhanced life cycle for the trolley and load bar assembly.

Therefore, the present invention provides a spacer or attachment element for spacing the trolley arms of a trolley, whereby the spacer element may provide an integral load bar attaching member that extends downward from the trolley for connecting to a slotted load bar. The attaching member of the present invention may include a shaft that extends downward from a body or spacing portion, with a larger diameter end portion formed at the lower end of the shaft. The shaft may be received within a slot or channel or open receiving portion at an end of the load bar and may be retained therein, such as via a retaining pin or the like. The end portion of the attaching member thus limits or substantially precludes downward movement of the load bar. Because the attachment/spacer element body portion and shaft portion and end portion are integrally formed, the spacer or attachment element and load bar of the present invention do not require threaded fasteners to secure the load bar to the trolley and, thus, avoids the potential danger of the threads becoming corroded and the fasteners and load bar detaching from the trolley. Also, because the attaching member is unitarily formed with the spacer or body portion, the present invention reduces the number of parts required to attach a load bar to the trolley or trolleys of a conveying system. In order to connect the load bar to respective trolleys of the conveyor system, an operator assembling the conveyor system need only slide the shaft portion of the attaching member into the respective slot of the load bar and insert or attach the retaining pin (or other retention means) to retain the shaft portion in the slot.

Changes and modifications in the specifically described embodiments may be carried out without departing from the principles of the present invention, which is intended to be limited only by the scope of the appended claims, as interpreted according to the principles of patent law.

The embodiments of the invention in which an exclusive property or privilege is claimed are defined as follows:

1. A trolley for a conveying system, said trolley being movable along a conveying track and comprising;
   a first trolley arm with a trolley wheel rotatably mounted thereon, said first trolley arm connecting to a first attachment element, said first attachment element comprising a base portion and an attaching member, said base portion and said attaching member being integrally formed together, wherein said attaching member comprises a shaft portion and an end portion and wherein said end portion has a larger effective diameter than said shaft portion;
   a second trolley arm with a trolley wheel rotatably mounted thereon, said trolley wheels of said first and second trolley arms being configured to roll along the conveying track; and
   a load bar, said load bar connecting between said first and second trolley arms to space said first and second trolley arms along the conveying track, said load bar connecting to said attaching member of said first attachment element, said load bar having a slot proximate to at least one end for receiving said attaching member, said slot extending through said load bar between an upper portion and a lower portion of said load bar, said slot being open at one of a lateral side portion of said load bar and a longitudinal end portion of said load bar so as to receive said shaft portion of said attaching member therein via insertion of said shaft portion of said attaching member into said open slot in one of a sidewardly direction and a longitudinal direction relative to said load bar, said shaft portion being configured to be received in said slot, said end portion of said attaching member being configured to limit movement of said end of said load bar along said shaft portion when said shaft portion is received in said slot, said attaching member being retainable in said slot, said first and second trolley arms being connected together via said load bar.

2. The trolley of claim 1, wherein said attaching member is retainable in said slot of said load bar via a retaining pin.

3. The trolley of claim 1, wherein said conveying track comprises one of a C-channel conveying track and an I-beam conveying track.

4. The trolley of claim 1, wherein said end portion is configured to limit downward movement of the end of said load bar when said shaft portion is received in said slot.

5. The trolley of claim 4, wherein said end portion has a width dimension greater than a width of said slot.

6. The trolley of claim 1, wherein said first attachment element comprises a unitarily forged attachment element.

7. The trolley of claim 1, wherein said second trolley arm connects to a second attachment element, said second attachment element comprising a base portion and an attaching member, said base portion and said attaching member being integrally formed together, said attaching member of said second attachment element being received within a slot at the other end of said load bar opposite to said first attachment element.

8. The trolley of claim 1, wherein said first attachment element is configured to connect to a chain link of a conveyor chain, the conveyor chain moving said trolley along said conveying track.

9. A trolley for a conveying system, said trolley being movable along a conveying track by a conveyor chain, said trolley comprising:

a first trolley arm with a trolley wheel rotatably mounted thereon, said first trolley arm connecting to a first attachment element, said first attachment element comprising a base portion and an attaching member, said base portion and said attaching member being integrally formed together, wherein said attaching member comprises a shaft portion and an end portion and wherein said end portion has a larger effective diameter than said shaft portion, said first attachment element being connected with a chain link of a conveyor chain;

a second trolley arm with a trolley wheel rotatably mounted thereon, said second trolley arm connecting to a second attachment element, said second attachment element comprising a base portion and an attaching member, said base portion and said attaching member being integrally formed together, wherein said attaching member comprises a shaft portion and an end portion and wherein said end portion has a larger effective diameter than said shaft portion, said second attachment element being connected with another chain link of the conveyor chain; and a load bar, said load bar connecting to said attaching members of said first and second attachment elements, said load bar having a slot proximate to each end for receiving a respective shaft portion of one of said attaching members, each of said slot extending through said load bar between an upper portion and a lower portion of said load bar, each of said slots being open at one of a lateral side portion of said load bar and a longitudinal end portion of said load bar so as to receive a respective shaft portion of said attaching members therein via insertion of said shaft portion into said open slot in one of a sidewardly direction and a longitudinal direction relative to said load bar, said shaft portion being configured to be received in said slot, said end portion of said attaching member being configured to limit movement of said end of said load bar along said shaft portion when said shaft portion is received in said slot, said attaching members being selectively retainable in said slots, said first and second trolley arms being connected together via said load bar while said trolley wheels generally align with and roll along the conveying track.

10. The trolley of claim 9, wherein said attaching members are selectively retainable in said slots via respective retaining pins.

11. The trolley of claim 9, wherein said conveying track comprises one of a C-channel conveying track and an I-beam conveying track.

12. The trolley of claim 9, wherein each of said end portions is configured to limit downward movement of said load bar when said load bar is attached to said attaching members.

13. The trolley of claim 9, wherein each of said first and second attachment elements comprise unitarily forged attachment elements.

14. A conveying system comprising:
a conveying track;
a continuous conveying chain, said conveying chain comprising a plurality of chain links connected together;

a first trolley arm with a trolley wheel rotatably mounted thereon, said trolley wheel rollingly engaging said conveyor track, said first trolley arm connecting to a first attachment element, said first attachment element comprising a base portion and an attaching member, said base portion and said attaching member being integrally formed together, wherein said attaching member comprises a shaft portion and an end portion and wherein said end portion has a larger effective diameter than said shaft portion, said base portion of said first attachment element being connected with one of said chain links of said conveyor chain;

a second trolley arm with a trolley wheel rotatably mounted thereon, said trolley wheel rollingly engaging said conveyor track, said second trolley arm connecting to a second attachment element, said second attachment element comprising a base portion and an attaching member, said base portion and said attaching member being integrally formed together, said base portion of said second attachment element being connected with another of said chain links of said conveyor chain; and a load bar, said load bar connecting to said attaching members of said first and second attachment elements, said load bar having a slot proximate to each end for receiving a respective one of said attaching members, each of said slots extending through said load bar between an upper portion and a lower portion of said load bar, each of said slots being open at one of a lateral side portion of said load bar and a longitudinal end portion of said load bar so as to receive a respective shaft portion of said attaching members therein via insertion of said shaft portion into said open slot in one of a sidewardly direction and a longitudinal direction relative to said load bar, said shaft portion being configured to he received in said slot, said end portion of said attaching member being configured to limit movement of said end of said load bar along said shaft portion when said shaft portion is received in said slot, said attaching members being selectively retainable in said slots, said first and second trolley arms being connected together via said load bar and said attachment elements.

15. The conveying system of claim 14, wherein said attaching members are selectively retainable in said slots via respective retaining pins.

16. The conveying system of claim 14, wherein said conveying track comprises one of a C-channel conveying track and an I-beam conveying track.

17. The conveying system of claim 14, wherein each of said end portions is configured to limit downward movement of said load bar when said load bar is attached to said attaching members.

18. The conveying system of claim 14, wherein each of said first and second attachment elements comprise unitarily forged attachment elements.

* * * * *

UNITED STATES PATENT AND TRADEMARK OFFICE
CERTIFICATE OF CORRECTION

PATENT NO. : 7,334,527 B2  
APPLICATION NO. : 11/088698  
DATED : February 26, 2008  
INVENTOR(S) : Lee R. Waldmiller Page 1 of 1

It is certified that error appears in the above-identified patent and that said Letters Patent is hereby corrected as shown below:

Column 6:
Line 4, claim 1, ";" should be --:--.

Column 7:
Line 26, claim 9, "slot" should be --slots--.

Column 8:
Line 35, claim 14, "he" should be --be--.

Signed and Sealed this

Twenty-third Day of September, 2008

JON W. DUDAS
*Director of the United States Patent and Trademark Office*